(12) United States Patent
Biedenweg

(10) Patent No.: US 6,209,477 B1
(45) Date of Patent: Apr. 3, 2001

(54) POWER RETRACTABLE TOP FOR A BOAT

(75) Inventor: Baron R. Biedenweg, Fort Wayne, IN (US)

(73) Assignee: Harris Kayot, Inc., Fort Wayne, IN (US)

( * ) Notice: Subject to any disclaimer, the term of this patent is extended or adjusted under 35 U.S.C. 154(b) by 0 days.

(21) Appl. No.: 09/370,630

(22) Filed: Aug. 6, 1999

(51) Int. Cl.[7] ............................................. B63B 17/00
(52) U.S. Cl. ........................................................ 114/361
(58) Field of Search ................................. 114/361, 343

(56) References Cited

U.S. PATENT DOCUMENTS

| | | | |
|---|---|---|---|
| 3,285,258 | 11/1966 | Hage et al. ............................... | 135/6 |
| 3,285,259 | 11/1966 | Hale ......................................... | 135/6 |
| 3,371,672 | 3/1968 | Hale et al. ............................... | 135/6 |
| 3,823,431 | 7/1974 | Miller ...................................... | 9/1 R |
| 3,906,563 * | 9/1975 | Bramhall ................................. | 114/361 |
| 4,926,782 | 5/1990 | Lacy ........................................ | 114/361 |
| 4,951,594 | 8/1990 | Feikema .................................. | 114/361 |
| 5,044,298 * | 9/1991 | Pepper et al. .......................... | 114/361 |
| 5,303,667 | 4/1994 | Zirkelbach et al. ................... | 114/361 |
| 5,697,320 * | 12/1997 | Murray .................................... | 114/361 |
| 5,706,752 | 1/1998 | Menne, Jr. et al. ................... | 114/361 |
| 5,803,104 * | 9/1998 | Pollen .................................... | 114/361 |

* cited by examiner

Primary Examiner—Stephen Avila
(74) Attorney, Agent, or Firm—Baker & Daniels

(57) ABSTRACT

The present invention provides a boat comprising a retractable top, at least one strut having a first end attached to the top, and motor driven retraction device attached to the boat. The electrically driven device is attached to the boat and operatively coupled to the strut by means of a rack and pinion arrangement. The strut is moved between its first and second positions by the electrically driven device, whereby the top is electrically raised and lowered.

18 Claims, 3 Drawing Sheets

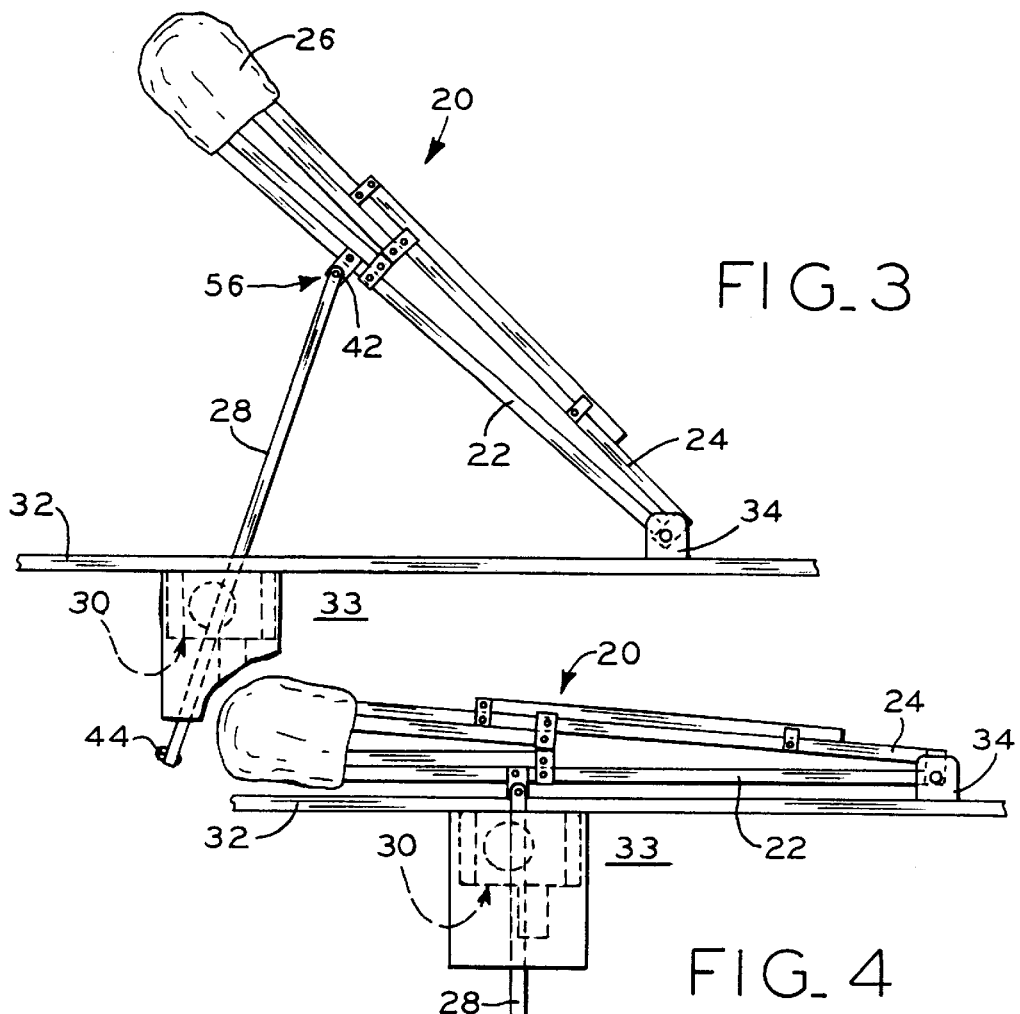
FIG. 3
FIG. 4
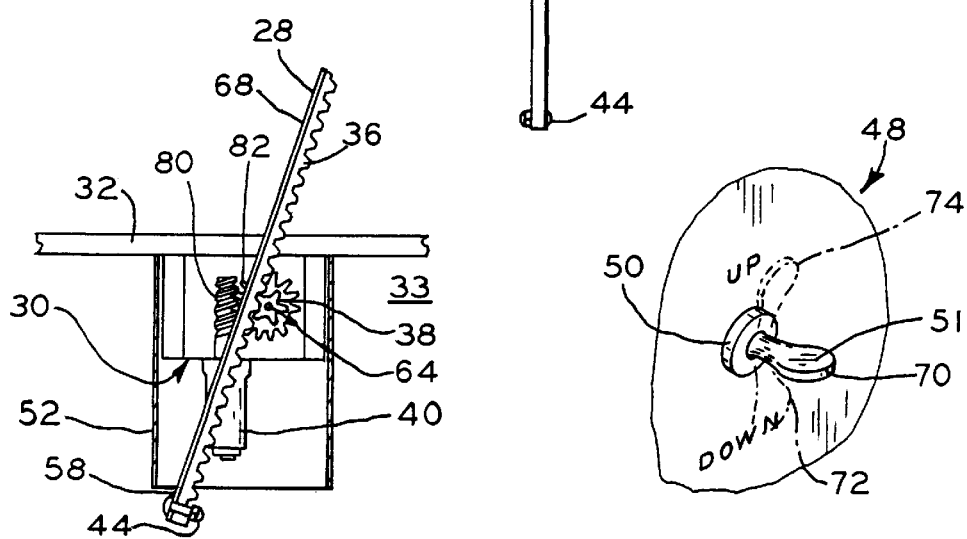
FIG. 5
FIG. 6

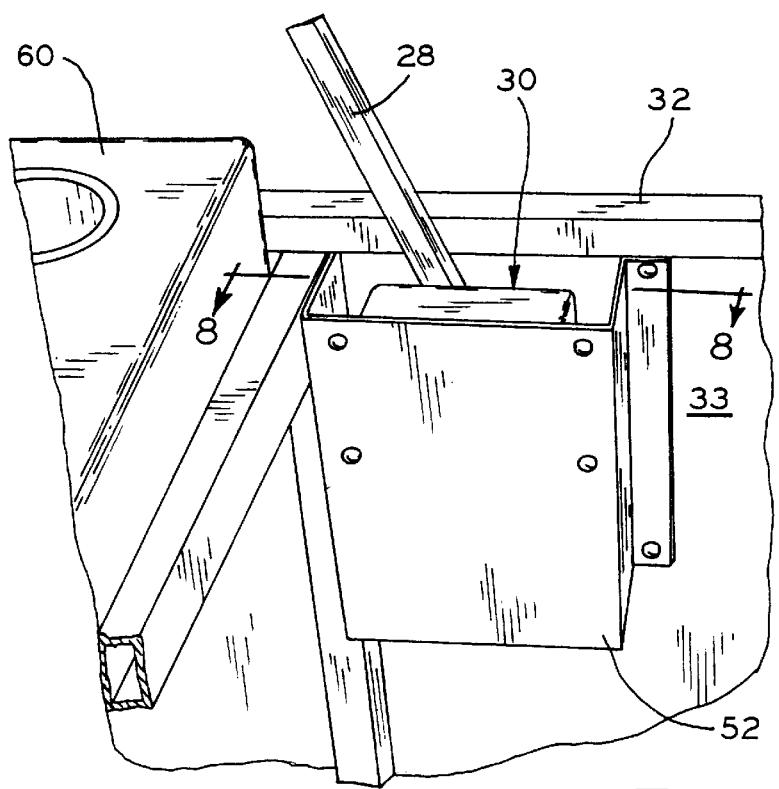
FIG._7
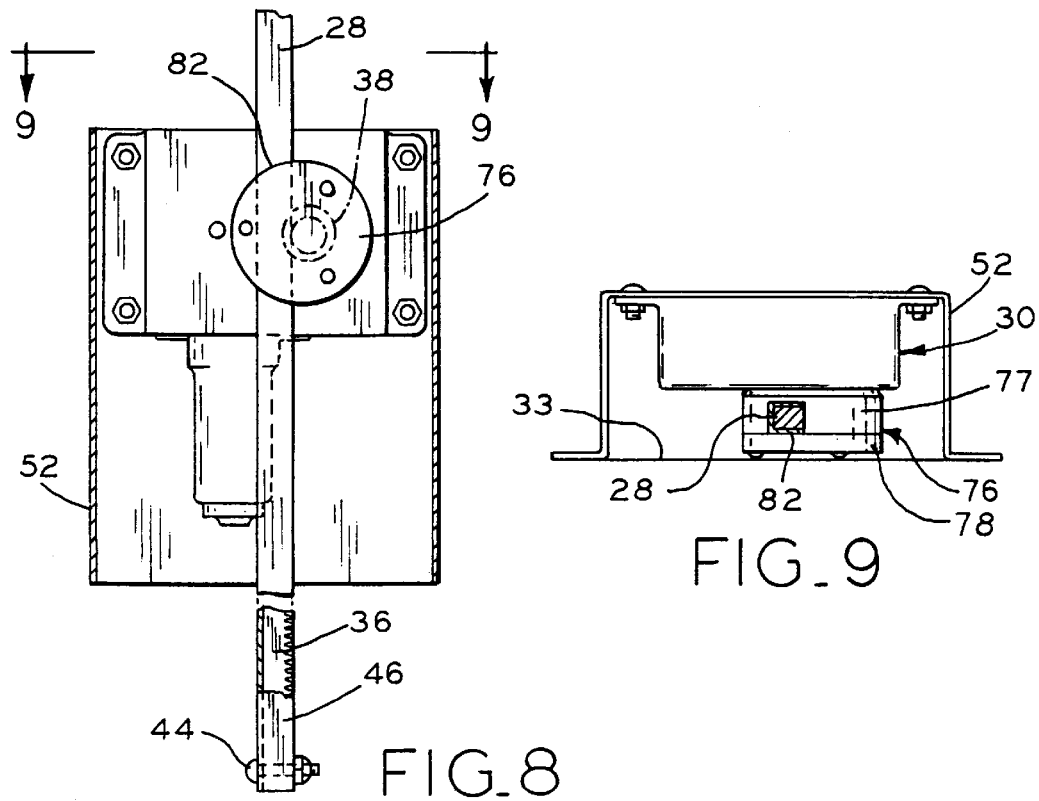
FIG._8
FIG._9

POWER RETRACTABLE TOP FOR A BOAT

BACKGROUND OF THE INVENTION

1. Field of the Invention

The invention relates to a retractable top for a boat, and more particularly to an remotely activated, power retractable bimini top for a pontoon boat.

2. Description of the Related Art

The unused bimini top usually has an angled "radar" position in which it is folded but propped up by means of a pair of struts. The top comprises a plurality of connected U-shaped support members, at least one of which is pivotally attached at its ends to rails on opposite sides of the boat. From the radar position the top is forwardly-extended into its unfolded position to provide shelter from sun or rain. Because some lakes have low bridges, covered boat lifts, boat houses or other overhead obstructions below which pontoon boats pass, typical bimini tops are temporarily retracted from their radar position into a substantially horizontal position. Pins which connect the supporting struts to one of the U-shaped support members of the top are removed, thereby allowing the top to be manually lowered to a substantially horizontal position. The struts, which are also pivotally attached to the boat rails, are also rotated into a substantially horizontal position. Once the overhead obstruction is cleared, the bimini top is then manually returned to its radar position by raising the U-shaped members and reconnecting the struts to the U-shaped member with the pins.

SUMMARY OF THE INVENTION

The present invention, in one form thereof, is a power retractable bimini top such as by an electric motor, a hydraulic mechanism or a motor over hydraulic mechanism. The top includes a gear rack on each of the rear struts which is engaged with a pinion gear driven by an electric motor. The boat operator merely activates a dashboard-mounted switch to actuate the motors, which causes the struts to move axially downward, thereby rotating the top downward from its radar position into a substantially horizontal position. The top is restored to its radar position by reversing the motors with the switch.

In one form, the present invention provides a boat comprising a retractable top, at least one strut and an electrically driven device. The strut has a first end attached to the retractable top, the strut having a first position in which the top is raised and a second position in which the top is retracted. The electrically driven device is mounted on the boat and coupled to the strut. The strut is moved between its first and second positions by the electrically driven device, whereby the top is electrically raised and lowered.

In a preferred form of the present invention, the boat comprises a retractable top pivotally attached to the boat, a pair of struts, and a pair of electrically driven devices attached to opposite sides of the boat. The retractable top has first and second positions. Each of the struts includes a gear rack and a first end attached to the top. Each of the electrically driven devices includes a pinion gear engaging a respective gear rack and a reversible electric motor driving the pinion gear. The retractable top is reversibly retracted from its first position to its second position.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction the accompanying drawings, wherein:

FIG. 3 is a side elevational view of the top, strut and motor drive according to one embodiment of the present invention showing the top in its radar position;

FIG. 4 is a side elevational view of the top, strut and motor drive of FIG. 3 showing the top in its retracted position;

FIG. 5 is an enlarged, fragmentary view of the strut and pinion gear assembly according to a preferred embodiment of the present invention;

FIG. 6 is a fragmentary view of the control panel of the boat of FIG. 1 showing a control for retracting and raising a bimini top in accordance with the present invention;

FIG. 7 is a perspective view of the motor drive attached to the side wall of the pontoon boat according to the preferred embodiment of the present invention;

FIG. 8 is a side sectional view of the moor drive and strut along view lines 8—8 of FIG. 7; a FIG. 9 is a top view of the motor drive and strut along view line 9—9 of FIG. 8.

Figure 1:
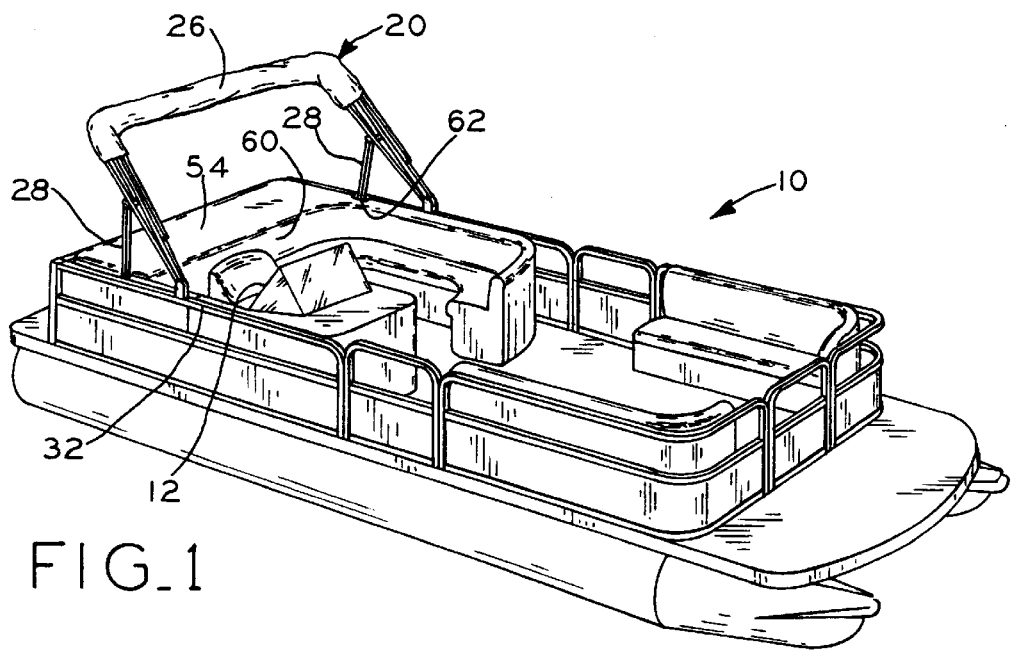
FIG. 1 is a perspective view of a pontoon boat having a retractable, folded bimini top according to the present invention in the radar or angled position.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates an embodiment of the invention, in one form, and such exemplification is not to be construed as limiting the scope of the invention in any manner.

DESCRIPTION OF THE PRESENT INVENTION

In FIGS. 1 through 4, bimini top 20 of pontoon boat 10 is shown in its folded or unused configuration, and as is well known, bimini top 20 may be unfolded into an extended configuration (not shown) to provide shelter. The present invention retracts and raises bimini top 20 while in its folded or unused configuration.

FIGS. 1 and 3 show bimini top 20 in its extended or erect position and comprises U-shaped frame members 22, 24, cover 26, which may be a woven fabric, and a pair of support struts 28. In this erect position, top 20 is angled towards the aft of pontoon boat 10. Frame members 22 and 24 are pivotably attached to boat rails 32 on opposite sides of boat 10 at pivotable connections 34 to allow the rotation of folded bimini top 20 thereabout as is conventional with such tops. Struts 28 each have lower end 58 coupled to a pair of power driven devices 30, preferably in the form of electric motor drive units, attached to side walls 33 located on opposite sides of boat 10, behind aft seat 60, in a compartment that is concealed by rear deck 54. Struts 28 extend through notches 62 provided in deck 54. The upper ends 56 of struts 28 are pivotably attached to respective frame members 22 at pivotable connections 42.

Figure 2:
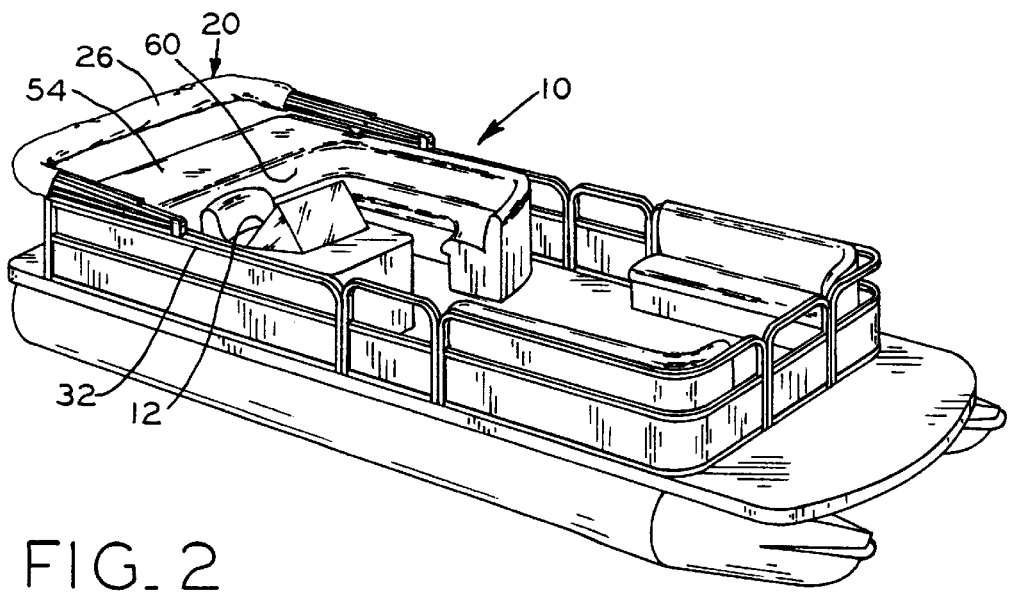
FIG. 2 is a perspective view of the pontoon boat of FIG. 1 with the folded bimini top in a substantially horizontal retracted position.

Referring to FIGS. 2 and 4, bimini top 20 on boat 10 is shown retracted to a substantially horizontal position, which minimizes the height of boat 10, thereby allowing it to pass under low bridges or other overhead obstructions. Bimini top 20 rotates at pivotable connections 34 with struts 28 moved axially downward by electrically driven devices 30 such that struts extend below rear deck 54.

Referring now to FIG. 5, retraction device 30 will be described in further detail. Each strut 28 includes gear rack 36, gear shield 46 (FIG. 8), and a nut and bolt forming stop 44 at lower end 58. Each motor drive 30 includes reversible DC motor 40 with worm gear 80, reducing gear 82 having shaft 64 and enmeshed with worm gear 80, pinion gear 38 within retainer 76 and attached to shaft 64 of reducing gear 82, and mounting bracket 52. Motor 40 drives pinion gear 38 by rotating worm gear 80 which drives reducing gear 82 attached to pinion gear 38 via shaft 64. Gear rack 36 of strut 28 is enmeshed with pinion gear 38, and retainer 76 engages strut 28 to maintain engagement of gear rack 36 and pinion gear 38. Stop 44 on strut 28 engages gear 38 and restricts the axial movement of strut 28 past retainer 76, such that strut 28 cannot be completely driven off of pinion gear 38.

Referring now to FIGS. 8 and 9, retainer 76 includes retainer body 77 and retainer cover 78. Retainer body 77 houses pinion gear 38 and includes channel 82 for strut 28. Strut 28 is held enmeshed with pinion gear 38 by channel 82 and within channel 82 by cover 78. Retainer 76 is made of a self lubricating nylon material.

Referring to FIG. 7, electrically driven device 30 is attached to mounting bracket 52. Mounting bracket 52 is attached to boat side wall 33 immediately below side rail 32 and behind aft seat 60.

When motor 40 rotates pinion gear 38 in a first direction (counterclockwise in FIG. 5), strut 28 is moved axially downward, thereby retracting bimini top 20. When motor 40 rotates pinion gear 38 in a second direction (clockwise in FIG. 5), strut 28 is moved axially upward, thereby raising bimini top 20. Motors 40 are controlled by three position switch 50 on control panel 48 (FIG. 6) located on dashboard 12 of boat 10. The three positions of paddle 51 of switch 50 include central neutral position 70 in which no power is provided to motors 40, retract ("DOWN") position 72, and raise ("UP") position 74. Switch paddle 51 is biased into and remains in neutral position 70 unless held in either retract position 72 or raise position 74. Switch 50 is connected to the boats battery (not shown) and selectively provides power to reversible motors 40, operating them in cooperation with each other to retract and raise bimini top 20. Motors 40 receive the identical power input from switch 50 operating motors 40 at the same speed, thus moving struts 28 in a synchronized manner.

The folded bimini top can be held in positions between the substantially horizontal position and the erect position by releasing the switch paddle prior to the bimini top reaching one of the two extreme positions. The top can then be raised or lowered from this position. The high resistance of the DC motor 40 to reverse in addition to the gear reduction of the worm gear drive holds the top 20 in place when not under power.

Although the present invention is shown adapted to a pontoon boat, it can be similarly adapted to other types of watercraft, such as fishing boats, deck boats or cruisers, for example.

Alternative embodiments of the present invention are envisioned which include means for retracting and raising the bimini top having a single strut coupled to a single reversible electrically driven device. Further, it is envisioned that gear rack 36 and pinion gear 38 may be replaced by a friction roller which frictionally engages the surfaces of struts 28.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. In combination:

a pontoon boat having a rear deck portion and side rails;

a retractable folding top mounted to said boat, said top having a raised folded position in which said top is angled rearwardly and upwardly and a retracted folded position in which said top is generally horizontal above and in close proximity to one of said side rails and said rear deck portion;

at least one movable strut attached to said top and boat and supporting said top, said strut having a first position in which said top is angled rearwardly and upwardly and a second position in which said top is retracted downwardly to said retracted position in close proximity to said one of said rear deck portion and said side rails; and a power driven device mounted on said boat and operatively coupled to said strut, said strut moved between its said first position and its said second position by said power driven device, whereby said top is raised and lowered.

2. The combination of claim 1, wherein said strut includes a gear rack and said power driven device includes an electric motor and gear driven thereby, said gear in engagement with said rack.

3. The combination of claim 2, wherein said power driven device includes a retainer maintaining engagement between said gear and said gear rack.

4. The combination of claim 2, further comprising a reversing switch, said switch electrically coupled to said electric motor, whereby said motor is activated selectively in one of two opposite directions upon activation of said switch.

5. The combination of claim 2, wherein said strut includes a lower end having a stop adjacent said rack, said stop engaging said power driven device in said first position, whereby movement of said strut beyond said first position is prevented.

6. The combination of claim 1, wherein said top is a bimini top having one of a folded or open configuration when said top is raised.

7. The combination of claim 6, wherein said bimini top comprises a plurality of U-shaped frame members, at least one of said U-shaped members pivotally attached to said boat.

8. The combination of claim 1, wherein said power driven device comprises an electric motor.

9. The combination of claim 8, wherein said motor is reversible.

10. In combination:

a boat;

a retractable top having a first position and a second position, said top pivotally attached to said boat;

a pair of struts each having a first end attached to said top and including a gear rack; and a pair of motor drives mounted on opposite sides of said boat, each said motor drive including a pinion gear engaging a respective said gear rack and a reversible electric motor operatively coupled to said pinion gear, said top reversibly retracted from its said first position to its said second position under the driving influence of said motors.

11. The combination of claim 10, wherein said top is angled toward the aft of said boat in its said first position and is substantially horizontal in its said second position.

12. The combination of claim 10, further comprising a switch electrically coupled to said electric motors.

13. The combination of claim 10, wherein each said strut includes a second end having a stop adjacent said rack, said stop engaging said motor drive in said first position, whereby movement of said strut beyond first position is prevented.

14. The combination of claim 10, wherein said top is a bimini top having one of a folded or open configuration when said top is raised.

15. The combination of claim 14, wherein said motor drive includes a retainer maintaining engagement between said gear and said gear rack.

16. In combination:
   a pontoon boat having side rails;
   a retractable folding top pivotally mounted to said boat, said top having a raised folded position in which said top is angled rearwardly and upwardly and a retracted folded position in which said top is generally horizontal above and in close proximity to said side rails; and
   at least one powered, movable strut connected to said top and selectively supporting said top in its raised and retracted positions.

17. The combination of claim 16, wherein said powered strut comprises a remotely controlled electrically raised and lowered strut.

18. The combination of claim 17 and including a second said electrically raised and lowered strut.

* * * * *